United States Patent
De Vaan (10) Patent No.: US 8,776,139 B2
(45) Date of Patent: Jul. 8, 2014

(54) SCHEDULING CONTENT TO BE RENDERED

(75) Inventor: Adrianus Johannes S. M. De Vaan, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 0 days.

(21) Appl. No.: 13/635,256

(22) PCT Filed: Mar. 8, 2011

(86) PCT No.: PCT/IB2011/050963
§ 371 (c)(1),
(2), (4) Date: Sep. 14, 2012

(87) PCT Pub. No.: WO2011/114258
PCT Pub. Date: Sep. 22, 2011

(65) Prior Publication Data
US 2013/0014181 A1  Jan. 10, 2013

(30) Foreign Application Priority Data

Mar. 18, 2010 (EP) .................................... 10156884

(51) Int. Cl.
*G06F 3/00* (2006.01)
*G06F 13/00* (2006.01)
*H04N 5/445* (2011.01)
*H04N 7/16* (2011.01)

(52) U.S. Cl.
USPC .................. 725/58; 725/47; 725/61; 725/141

(58) Field of Classification Search
CPC .......... H04N 21/43615; H04N 21/472; H04N 21/482
USPC ......... 725/51, 58–59, 61, 105, 120, 131, 133, 725/135, 141–142, 151, 153, 37, 52, 97
See application file for complete search history.

(56) References Cited

U.S. PATENT DOCUMENTS

| | | | |
|---|---|---|---|
| 2005/0108770 A1* | 5/2005 | Karaoguz et al. | 725/131 |
| 2008/0033990 A1* | 2/2008 | Hutson et al. | 707/104.1 |
| 2009/0248702 A1* | 10/2009 | Schwartz et al. | 707/10 |
| 2011/0004330 A1* | 1/2011 | Rothkopf et al. | 700/94 |

* cited by examiner

*Primary Examiner* — Hai V Tran
(74) *Attorney, Agent, or Firm* — Shimokaji & Assoc., P.C.

(57) ABSTRACT

A method and network connected rendering apparatus (130) are described. The network connected rendering apparatus (130) receives a command to play a content item and/or the content item to be played from another network connected device (110). Instead of automatically interrupting the current rendering activities of the rendering apparatus for playing the content item, the content item is added to a list of scheduled content items (140).

13 Claims, 6 Drawing Sheets

| TV Scheduler | | | | | |
|---|---|---|---|---|---|
| Programmed | Title | Entry date | by | origin | source |
| Next right to watch | Flinstones the movie | 8-10-09 13:07 | David | netbook | Ziggo VOD server |
| 2nd | Top Gear Captain Slow driving fast | 5-10-09 23:04 | ? | TV | topgear.com |
| 3rd | David birth days party | 8-10-09 19:07 | Mam | iPhone mam | iPhone mam |
| 4th | MTV music awards 2009 | 8-10-09 17:24 | Cathy | Cathy's PC | MTV.com |
| 5th | Idols: Interview with Gordon | 8-10-09 17:28 | Cathy | Cathy's PC | Idols.nl |
| 6th | Teletubbies Say 'Eh Oh!' | 8-10-09 10:53 | Mam | TV | Youtube.com |
| 7th | Documentary: the Amazon River | 8-10-09 22:04 | Dad | Dad's Mobile | national geographic channel |

SCHEDULING CONTENT TO BE RENDERED

BACKGROUND OF THE INVENTION

1. Technical Field

The present invention relates to the field of network connected devices and more particularly to the rendering of content by a network connected rendering apparatus, such as a network connected TV.

2. Description of Related Art

It is expected that network connected TV's will rapidly gain popularity. Such television sets are often connected to the Internet and many programs can be viewed originating from all kind of network connected sources. Programs can be selected by the integrated (web) browser of the network connected TV.

The DLNA (Digital Living Network Alliance) is currently developing a standard for creating interoperable network connected devices, in particular for home entertainment. As a result, network connected TV's soon can also be controlled from other network connected devices in their neighborhood. DLNA 1.5 defines the use of a "push to" command, as explained in more detail in "How DLNA and UPnP will enable easy home video networks", EE Times; http://www.eetindia.co.in/ART_8800388883_1800006_NP_d5e98a69.HTM. When a file comprising interesting content is found by means of a network connected device (e.g. a notebook), this "push to" command results in this file being delivered to the network connected rendering apparatus (e.g. the network connected TV) for playing. As future television sets will be provided with such DLNA technology, programs can be viewed on the TV that are started up from other network connected devices.

Rendering devices such as television sets are generally used in a social household environment, where multiple people make use of the TV display to watch programs in a cinema experience environment. So, often these programs are viewed by a number of viewers, simultaneously.

The search for interesting content to push to a television set will mostly be an individual activity. Generally, a device optimized for individual use, such as a PC, a netbook, a mobile phone or an MP4 player etc. will be used for this purpose.

Due to the availability of many network connected devices, often situations will occur where a family member starts browsing on e.g. a netbook for a content item of his interest, while other family members are watching a program outside his scope of interest.

When this person finds an interesting program or file, he will have a desire to push this file to the TV set. However, if this content item starts to play immediately, this leads to an interruption of the content item that is currently being rendered, causing an inconvenient situation for the other members of the household that are watching this content item.

Furthermore, multiple persons will identify their wishes for content to watch on the TV screen. Therefore, conflicts may be expected between family members regarding the order and/or time when their preferred content items can be viewed.

SUMMARY OF THE INVENTION

It would be desirable to avoid interruptions of content being rendered on network connected rendering apparatuses, such as network connected TV's, in case of "pushing" files thereto from other network connected devices.

To better address this concern, according to an aspect of the invention a method is provided of scheduling content to be rendered by a network connected rendering apparatus. The method comprises the steps of: receiving a command to play a content item and/or the content item to be played at the rendering apparatus from another network connected device; and instead of automatically interrupting the current rendering activities of the rendering apparatus for playing the content item, adding the content item to a list of scheduled content items. Consequently, an interruption of the content item being rendered by the network connected rendering apparatus is avoided in case of pushing a file thereto from another network connected device.

The content item may be added at the bottom of the scheduler list and the listed content items can be moved up/down dependent on the priority given by the family. This repositioning of the scheduled programs may be performed by using the control buttons of the remote control, for example. Additional information to the listed programs can be displayed according to the family rules. For example, the order in which the content items have been added to the list may be displayed.

According to an embodiment of the present invention the commands to play the content item and/or the content item are received from multiple network connected devices and the content items are added to the same list of scheduled content items. By maintaining a single list of scheduled content items conflicts between household members regarding the order and/or time of rendering their preferred content items are solved.

According to a further embodiment of the present invention, upon receiving the command, the rendering apparatus provides a feedback message to the other network connected device that the content item is played. So, the other network connected device is made to believe that the content item that was selected for playing is actually being played by the rendering apparatus, although in fact it is still in the list of scheduled items. As a result, the network connected device will refrain from pushing the content item to the rendering apparatus before this is really necessary (i.e. at the time that the content item is scheduled for playing). In this way, long lasting storage is avoided of the content item in a mass memory of the rendering apparatus.

According to a still further embodiment, additional information required to play the content at a later time is stored. Such information is for example the identity of the network connected source device supplying the content item, so that this source device can be powered at the time it needs to play the content item.

The content item itself may be received at the rendering apparatus from the other network connected device, for example in case of the user providing a "push-to" command. Alternatively, a network connected device sends a command to the rendering apparatus for playing the content item. This command may comprise a location of the content item at an external network, for example the Internet, for retrieving the content item by the rendering apparatus. When according to the list of scheduled content items it is time to play the content item, the rendering apparatus accesses the Internet location at which the content item is stored.

According to a yet further embodiment, the user is enabled to re-order the rendering of the list of scheduled content items. The scheduler list may for example be popped up on the display using a "scheduler button" on the remote control of the TV-set. In this way, the household members are enabled to access the scheduler list at any time.

There may be a category of content items of the broadcast type for which the current rendering activities are interrupted at the time that they start broadcasting. In this way, it is avoided that such broadcast content items are "forgotten" for rendering. This would be detrimental because such broadcast content items are not available any more after the broadcast or if they are, they often have a decreased news value.

In the scheduler, start dates and times of scheduled content items may be programmed at which the scheduled content items are intended to be played. This information may be used either for starting to play the content items at that moment or as an indication to the users that one of them has the right granted to watch his desired content item at that moment.

If the rendering apparatus has no current rendering activities, a user may be enabled to select a content item from the list for rendering. As a result, at times that there is no rendering activity, any of the content items from the list may be given preference and be selected for playing directly.

Preferably, the method according to the invention is implemented by means of a computer program.

The computer program may be embodied on a computer readable medium or a carrier medium may carry the computer program.

According to a further aspect of the invention, a network connected rendering apparatus is provided comprising:
  a receiver for receiving a command to play a content item at the rendering apparatus from another network connected device; and
  a scheduler configured for, instead of automatically interrupting the current rendering activities of the rendering apparatus and playing the content item, adding the content item to a list of scheduled content items.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

The present invention may be implemented in interoperable network connected devices. The network connected devices may be Digital Living Network Alliance (DLNA) certified devices as described in more detail at http://www.dlna.org/digital_living/getting_started/. DLNA Certified devices connect, discover and communicate with each other over a home network, like the one that already is available in many homes for sharing the broadband Internet connection.

Figure 1:
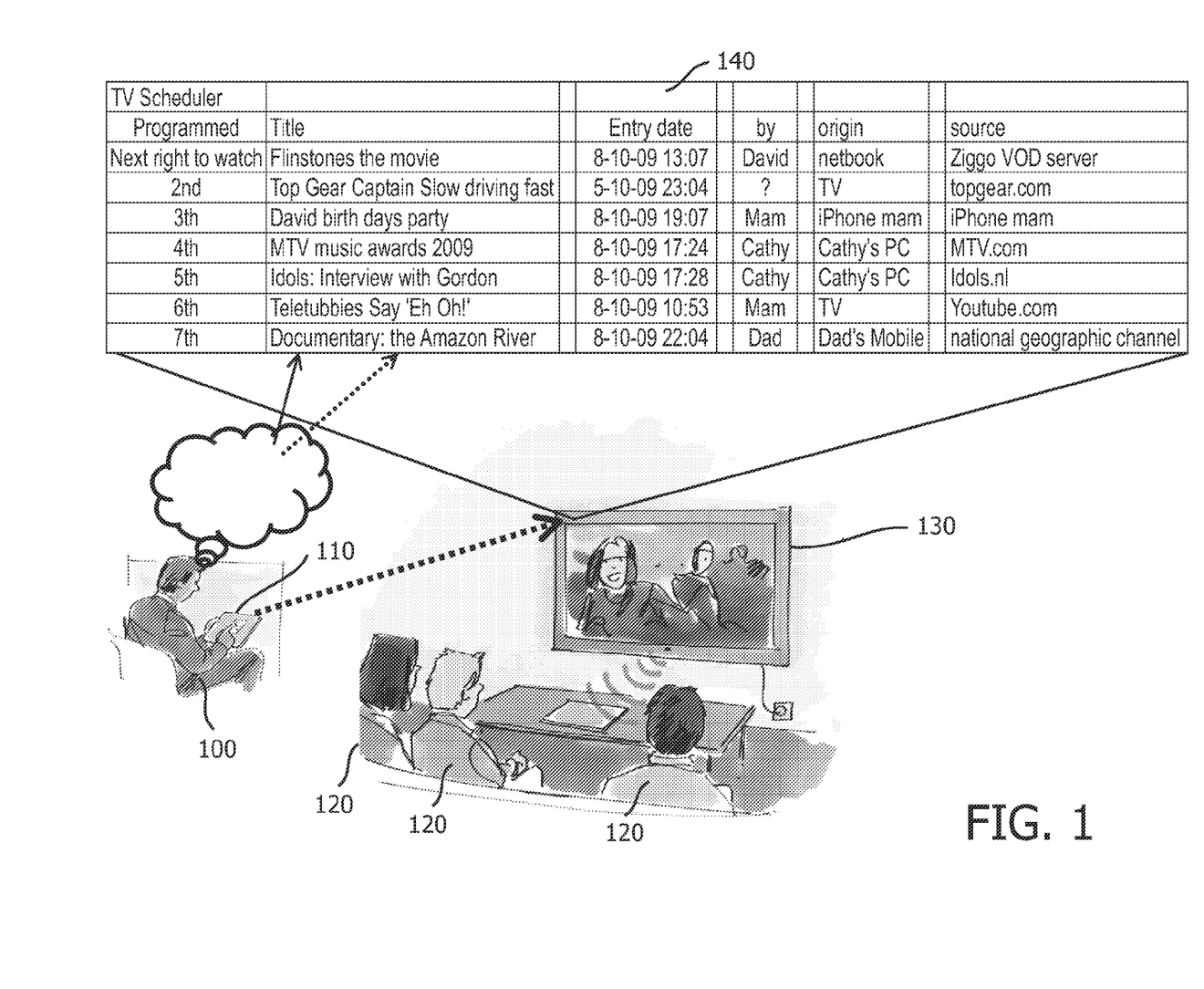
FIG. 1 shows the pushing of a content item to a network connected rendering apparatus and adding it to a scheduler list according to an exemplary embodiment of the invention.

In the example shown in FIG. 1, a first family member 100 browses the Internet with a network connected device 110. The network connected device 110 may be a mobile phone, a net book, notebook or a PC, etc. In the meantime the remaining family members 120 are watching a program on a network connected rendering apparatus 130, e.g. a network connected TV. The first family member finds a content item of his interest on the Internet "Documentary: the Amazon River" on the national geographic channel website. He downloads the file and stores it in the device 110. He then uses a push-to command as defined in DLNA version 1.5 to play the content on the content rendering apparatus.

According to a first embodiment, this results in the file, which comprises the content item, being delivered from the device 110 to the network connected TV 130. Furthermore, a DLNA based string of commands in XLM format: SetAVTransportURL(0, url, metadata); //connection id; Play(0, 1); // connection id, speed 1==(wherein speed 1==means normal play) is transmitted from the device 110 to the network connected TV 130. Upon receiving the DLNA based string of commands by the network connected TV 130 and the file comprising the content from the device 110, the string is added to the bottom of a play list 140 of scheduled content items instead of directly executing it by the TV. The file comprising the content item is stored in a mass storage memory, such as e.g. an USB stick inserted into one of the TV's USB slots. The program that is playing on the network connected TV is not interrupted. The scheduler list 140 comprises several parameters for each of the items. Apart from the title of the content item, the position of the right to watch is stored, the entry date and time, by whom (which family member) it was entered on the list, the network connected device (origin) by means of which it was entered and the source of the content item.

Alternatively or additionally, start dates and times may be programmed in the list indicating when the scheduled content item is intended to start playing on the network connected TV. The start date and times may either be used for automatically starting to play the corresponding file at that moment or as an indication to the family that a family member has the right to watch his desired content item at that moment.

According to a second embodiment, the push-to command only results in the transmission of a DLNA based string of commands in XLM format from the device 110 to the network connected TV 130. The file comprising the content item itself is not transmitted. Instead, the commands comprise the location of the file on an external network, such as the Internet, so that the network connected TV can retrieve it, when it is needed for playing. So, in the second embodiment the originating network connected device (the device being used by the user for finding the content item) preferably does not push the content item to the network connected rendering apparatus since this is useless at that moment. Alternatively, if the originating device does not have that capability, it pushes the content and this is thrown away at the TV site. The TV however generates a set of commands to control the source device later in time to request it to play the content at the moment it is desired.

According to a third embodiment, the network connected rendering apparatus after receiving the DLNA based string of commands from the originating device returns a feedback message thereto, that the content item is already playing. This will "fool" the originating device and make it believe that the transmission of the content item to the rendering apparatus has already been performed and that it is no longer necessary. Later, when the content item has to be played according to the scheduled list, the rendering apparatus uses a new set of modified commands requesting to send the file with the content item. The originating device starts sending the content to the rendering apparatus. So, it is needed to provide proper feedback to the originating device to keep consistency in operating it.

In the second and third embodiments it is avoided that the content item is stored in a mass memory of the network connected rendering apparatus. In case that this rendering apparatus is a network connected TV, the mass memory is of a rather limited size, so complete storage of all content items listed in the scheduled list would be impossible. This problem could of course be solved by increasing the memory size or by providing a USB-port for plugging in a memory stick to the TV but both solutions add to the cost of the system.

Executing a content item programmed in the scheduler can be done in a number of ways. This depends on the source of the file to play. This may be a simple execution of the DLNA commands as received but sometimes a reprogramming is needed to a number of executable commands, such that proper playback is obtained. For example, if the content item is stored at a server on the Internet or on the originating (source) device in the DLNA network, the following command sequence may be used.

It starts with a request for a server list to the DLNA stack (software in the network connected TV 130). This request can be composed based on SSDP (Simple Service Discovery Protocol) alive messages that are picked up by the network connected TV 130. These SSDP alive messages are messages, which are broadcast by other devices in the DLNA network and which can be initiated by a SSDP request of the network connected TV 130. In this way, the DLNA stack knows the other DLNA devices in the surroundings of the network connected TV 130 and can retrieve the server list from these devices.

Browsing on the CDS (Content Directory Service) by using UPnP (universal Plug and Play). The CDS returns an URL for every item in the scheduler list to the network connected TV 130. The URL identifies the location at which an item is stored.

This URL can be streamed with HTTP-GET, thereby retrieving the content item by the network connected TV 130.

Figure 2:
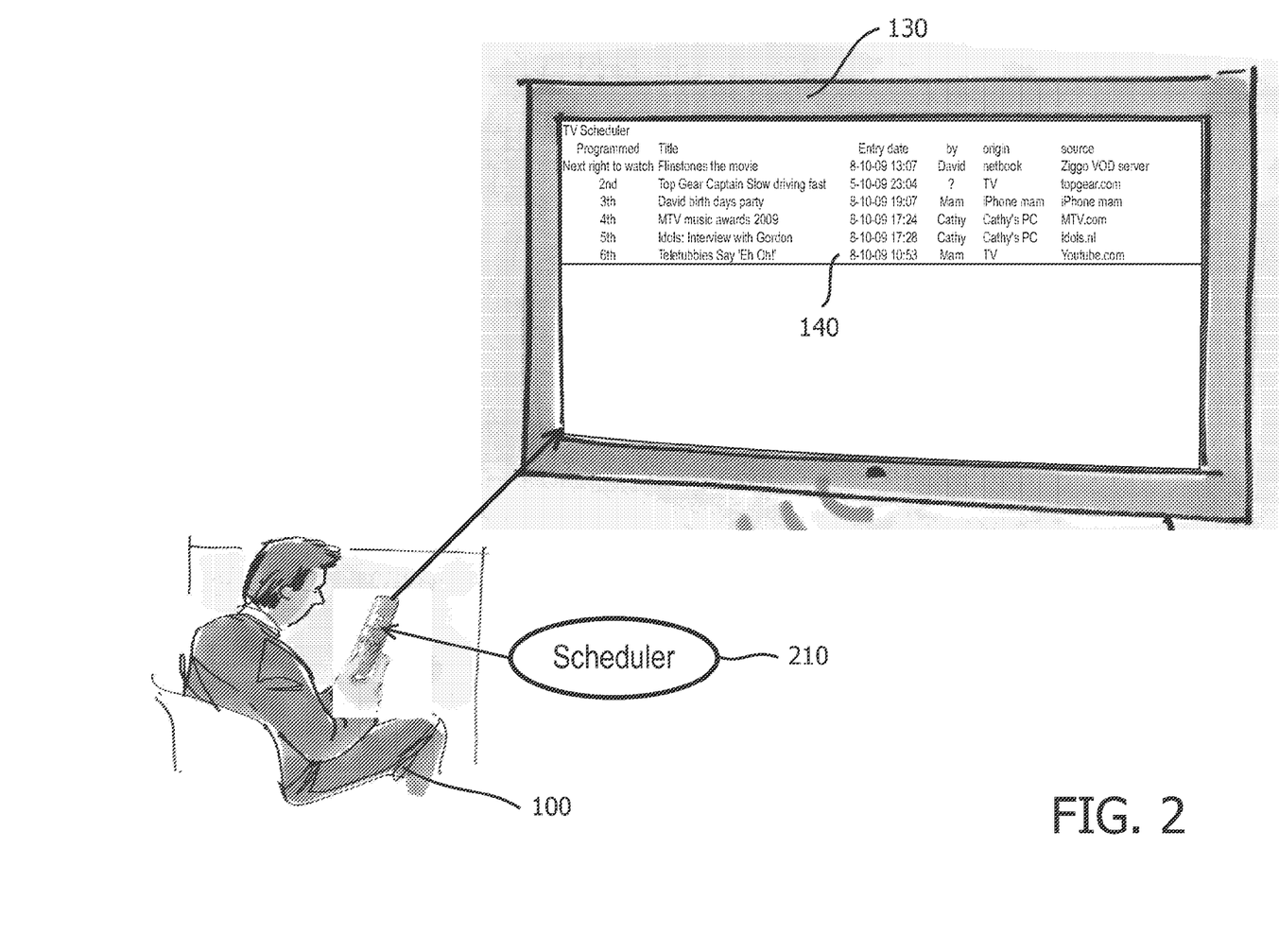
FIG. 2 shows the popping up of the scheduler list on a display of the network connected rendering apparatus according to an exemplary embodiment of the invention.

The play list 140 may be automatically displayed briefly by the network connected TV 130 at the time that a new content item is added or such an initial display of the list may be refrained from to avoid disturbing the viewers of the current program. The list may then be re-ordered on the display using a "scheduler button" 210 on the network connected TV remote control 200, as shown in FIG. 2.

Figure 3:
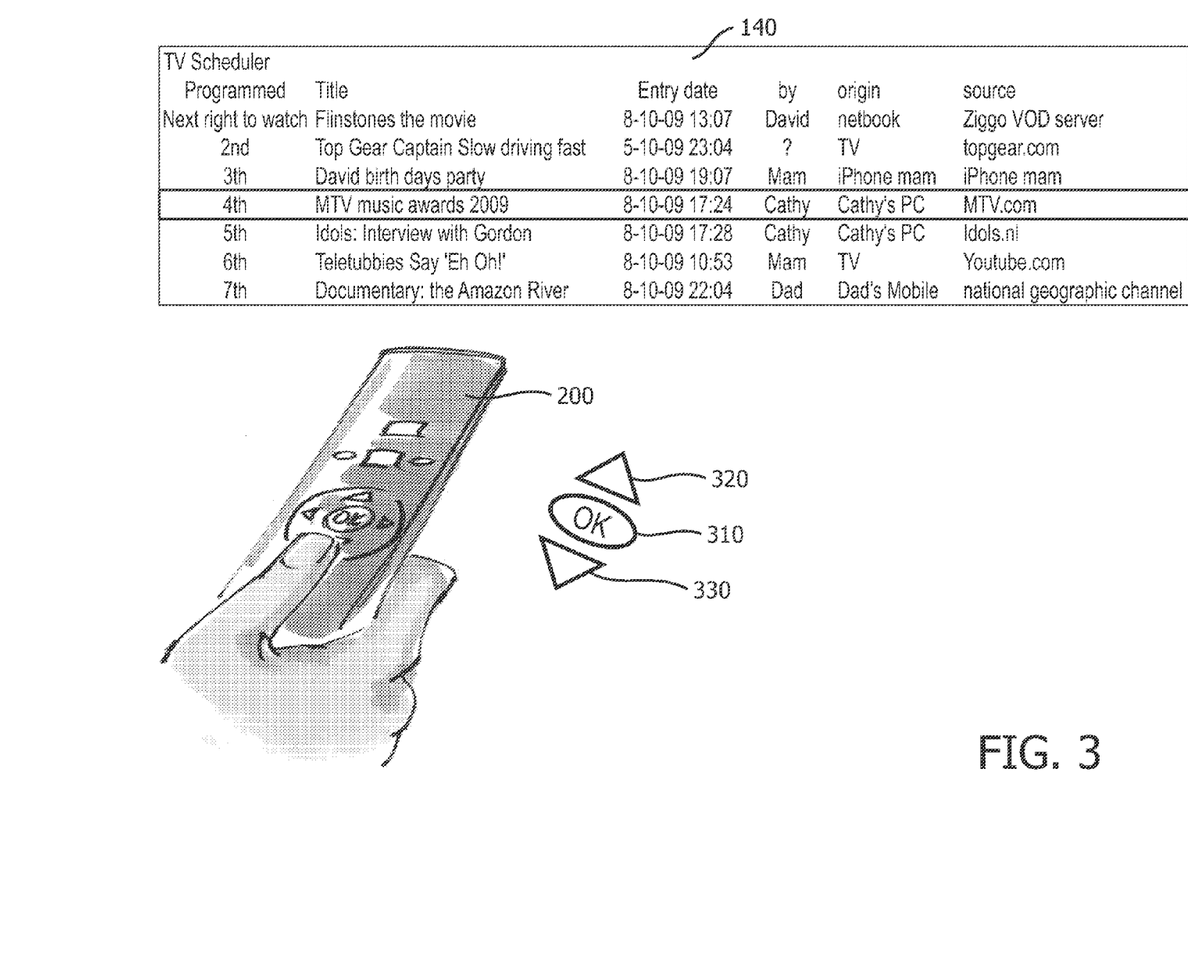
FIG. 3 shows selection and moving up and down of content items listed in the scheduler according to an exemplary embodiment of the invention.

Content items in the scheduled list 140 can be selected and deselected by using a select/deselect button 310 on the remote control 200 and pushed up/down in the list 140 by using the position up key 320 and position down key 330, respectively, as shown in FIG. 3. In this way, a content item may be moved up to the top to indicate the first right to watch this file to the family members.

Figure 4:
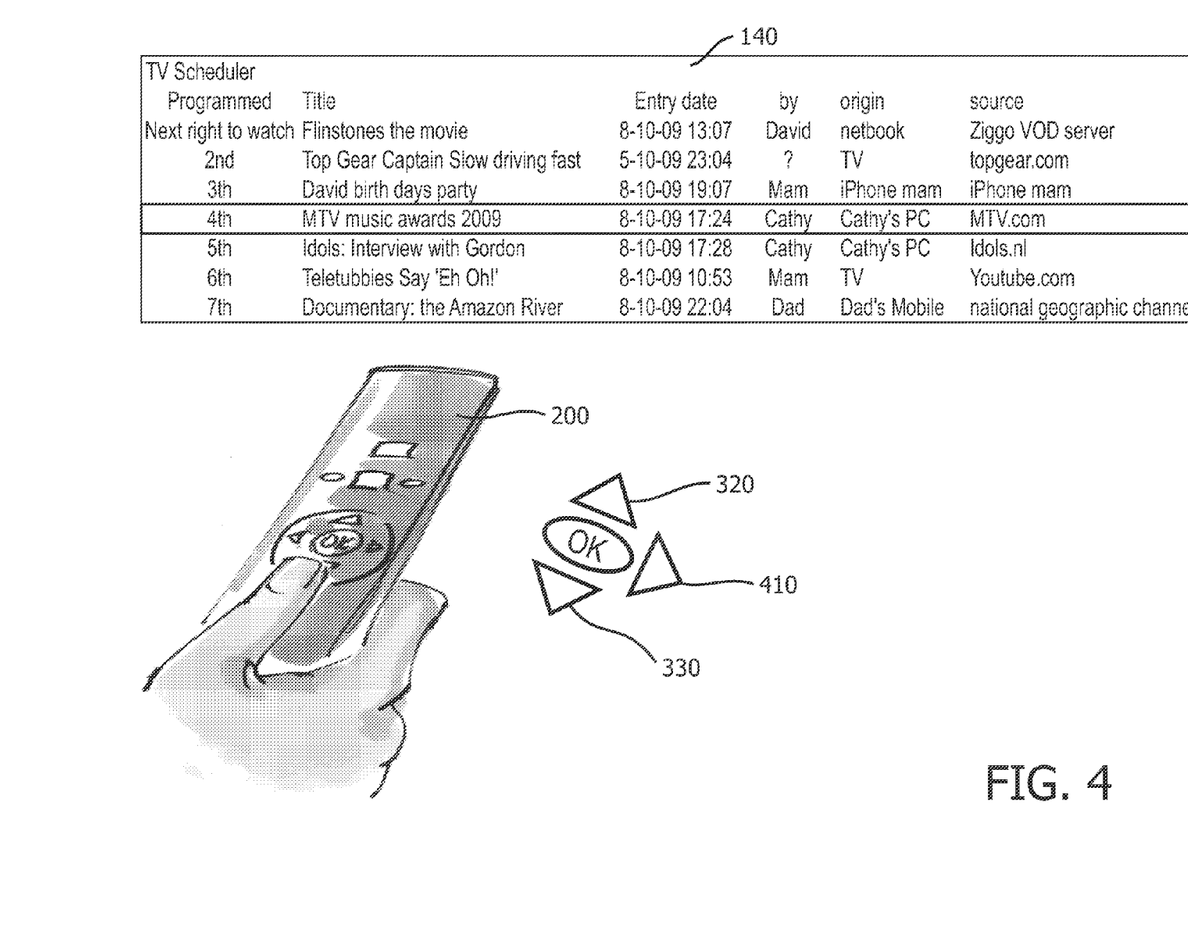
FIG. 4 shows starting a content item from the scheduler list according to an exemplary embodiment of the invention.

At the moment that the TV is available for viewing a new program, i.e. there is no current rendering activity, any program on the list of scheduled content items can be started by means of a "play now" key 410 on the remote control 200, as shown in FIG. 4. So, in this way, the scheduling order of items in the play-list 140 can be overruled.

Dependent on the source of the content item to be played, the network connected TV 130 may store additional information required to play the item at a later time. Such additional information can for example be a command to be sent from the TV to the originating device to switch its power on. For example, in the third embodiment described herein above, the network connected device (originating device) that is used to retrieve the content item may be a net book or a PC, which may be hibernating. In this case it may be necessary to switch this device on.

Figure 5:
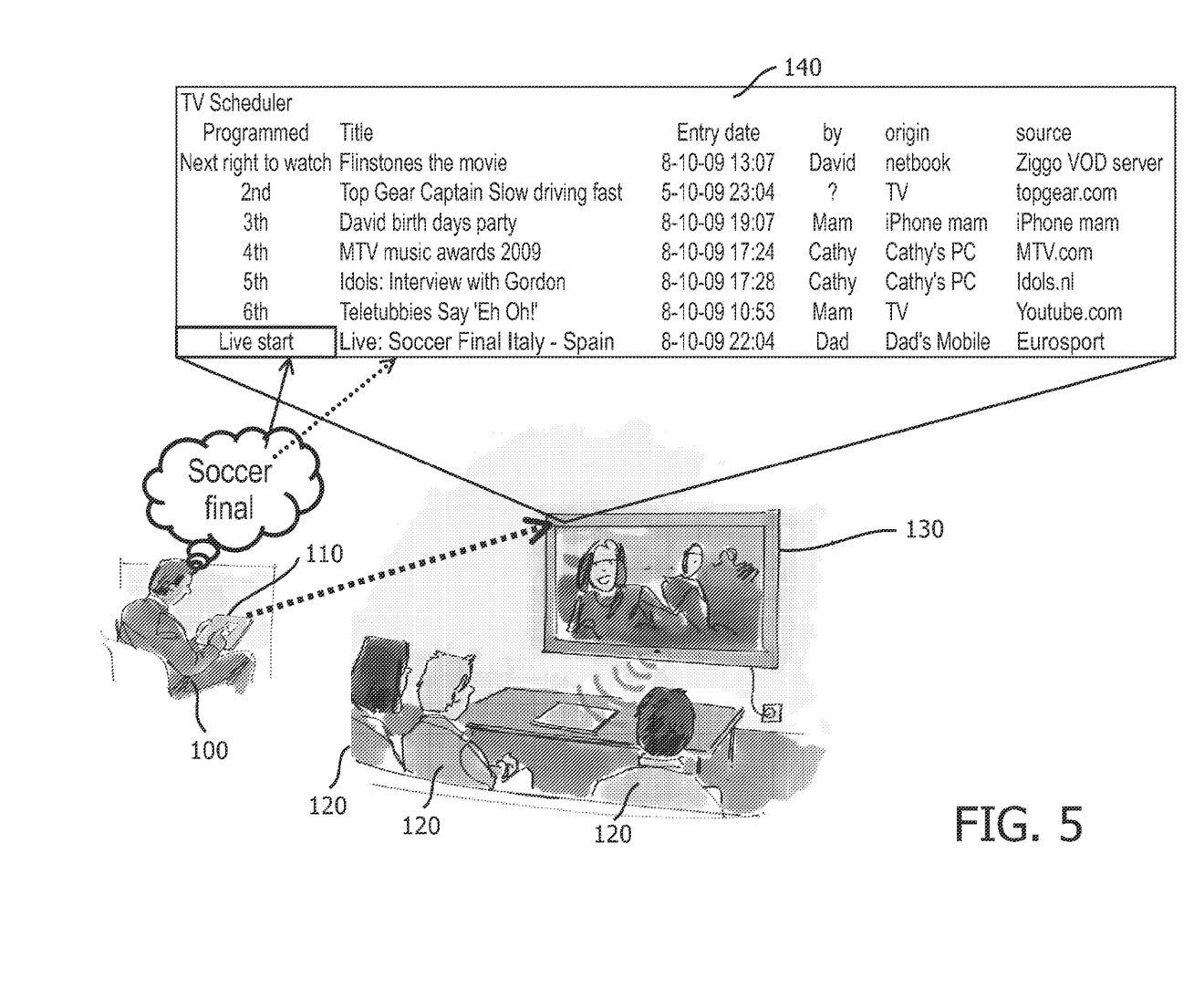
FIG. 5 shows the addition of a content item in the "live start" category to the scheduler list according to an exemplary embodiment of the invention.

Dependent on the family rules, some programs may be intended to be rendered live on the network connected TV. These programs can be programmed in the scheduled list as a special category with a "live play setting". This is shown in FIG. 5, where a live soccer final is programmed. Content items in the "live start" category overrule/interrupt other programs at the moment that the broadcasting thereof starts.

Figure 6:
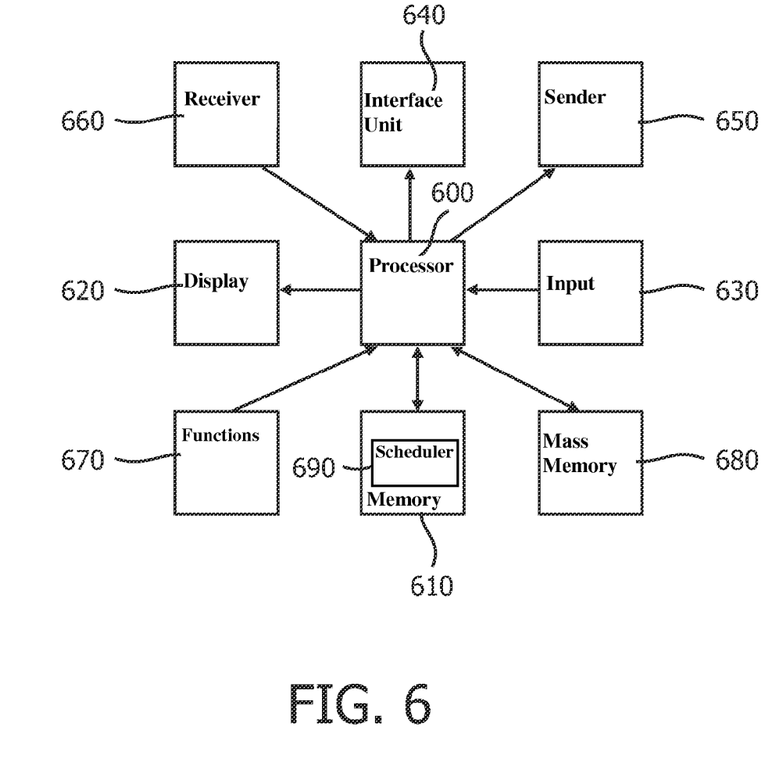
FIG. 6 shows a block diagram of a network connected rendering apparatus configured for implementing a scheduler list according to an exemplary embodiment of the invention.

FIG. 6 shows a block diagram of an exemplary network connected rendering apparatus 130, for example a network connected TV, for implementing the present invention. Only those features relevant for understanding the present invention are shown. The apparatus comprises a controller (processor) 600 with an associated memory 610, a display (e.g. a TV screen) 620, an input device 630 (which may be remote control 200) enabling the user to provide input commands, and an interface unit 640, such as a router or modem for connection to the Internet. It furthermore comprises a sender 650 for sending data to other interoperable network devices, a receiver 660 for receiving data from the other interoperable network devices, functionality 670 related to receiving TV-programs, e.g. from a cable TV-network or from a DVB network, filtering programs for display, etc and a mass memory 680.

The functionality shown in FIGS. 1-5 is preferably implemented by means of a suitable computer program loaded to the associated memory of the processor 610. By means of this computer program a scheduler 690 is created for scheduling the rendering of content items.

While the invention has been illustrated and described in detail in the drawings and foregoing description, such illustration and description are to be considered illustrative or exemplary and not restrictive; the invention is not limited to the disclosed embodiments.

In this regard it is to be noted that dedicated DLNA solutions may be developed, such that the list of scheduled items is accessible from the other network connected devices.

Furthermore, the invention can be implemented for other kinds of network connected devices with implemented interoperability than DLNA certified devices.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless

The invention claimed is:

1. A method of scheduling content to be rendered by a network connected rendering apparatus comprising:
   receiving a command to play a content item at the network connected rendering apparatus from another network connected device; and
   instead of automatically interrupting the current rendering activities of the network connected rendering apparatus for playing the content item,
      adding the content item to a list of scheduled content items,
      not playing the content item from the list of scheduled content items, and
      providing a feedback message to the other network connected devices indicating that the content item from the list of scheduled content items has already played, while maintaining the content item, without actually playing, in queue on the list of scheduled content items.

2. The method of claim 1, wherein the command to play the content item is received from multiple network connected devices and wherein the content item from multiple network connected devices is added to the same list of scheduled content items.

3. The method of claim 1, further comprising the step of storing additional information required to play the content at a later time.

4. The method of claim 1, wherein the content item itself is received at the network connected rendering apparatus from the other network connected devices or wherein the command of playing the content item comprises a location of the content item in an external network for retrieving the content item by the network connected rendering apparatus.

5. The method of claim 1, further comprising the step of enabling a user to re-order the rendering of the list of scheduled content items.

6. The method of claim 1, further comprising the step of, for a category of content items, interrupting the current rendering activities at the time that the content item starts broadcasting.

7. The method of claim 1, further comprising the step of programming start dates and times of scheduled content items at which the scheduled content items are intended to be played.

8. The method of claim 1, further comprising the step of enabling a user to select a content item from the list for rendering if the network connected rendering apparatus has no current rendering activities.

9. A computer program product for scheduling content to be rendered by a network connected rendering apparatus, the computer program product stored on a non-transitory computer readable medium having computer readable program code embodied therewith, the computer readable program code when said program code is run on a computer and executed by a processor to:
   receive a command to play a content item at the network connected rendering apparatus from another network connected device; and
   instead of automatically interrupting the current rendering activities of the network connected rendering apparatus for playing the content item,
      adding the content item to a list of scheduled content items,
      not playing the content item from the list of scheduled content items, and
      providing a feedback message to the other network connected devices indicating that the content item from the list of scheduled content items has already played, while maintaining the content item, without actually playing, in queue on the list of scheduled content items.

10. A network connected rendering apparatus, comprising:
    a receiver that receives a command to play a content item at the network connected rendering apparatus from another network connected device; and
    a scheduler, via a processor that instead of automatically interrupting the current rendering activities of the network connected rendering apparatus and playing the content item,
       adds the content item to a list of scheduled content items,
       does not play the content item from the list of scheduled content items, and
       provides a feedback message to the other network connected devices indicating that the content item from the list of scheduled content items has already played, while maintaining the content item, without actually playing, in queue on the list of scheduled content items.

11. The network connected rendering apparatus of claim 10, wherein the receiver receives the command to play the content item from multiple network connected devices and wherein the scheduler adds the content items from multiple network connected devices to the same list of scheduled content items.

12. The network connected rendering apparatus of claim 10, wherein the scheduler, for a category of content items, interrupts the current rendering activities at the time that the content item starts broadcasting.

13. The network connected rendering apparatus of claim 10, wherein the scheduler programs start dates and times of scheduled content items at which the scheduled content items are intended to be played.

* * * * *